United States Patent Office 3,342,657
Patented Sept. 19, 1967

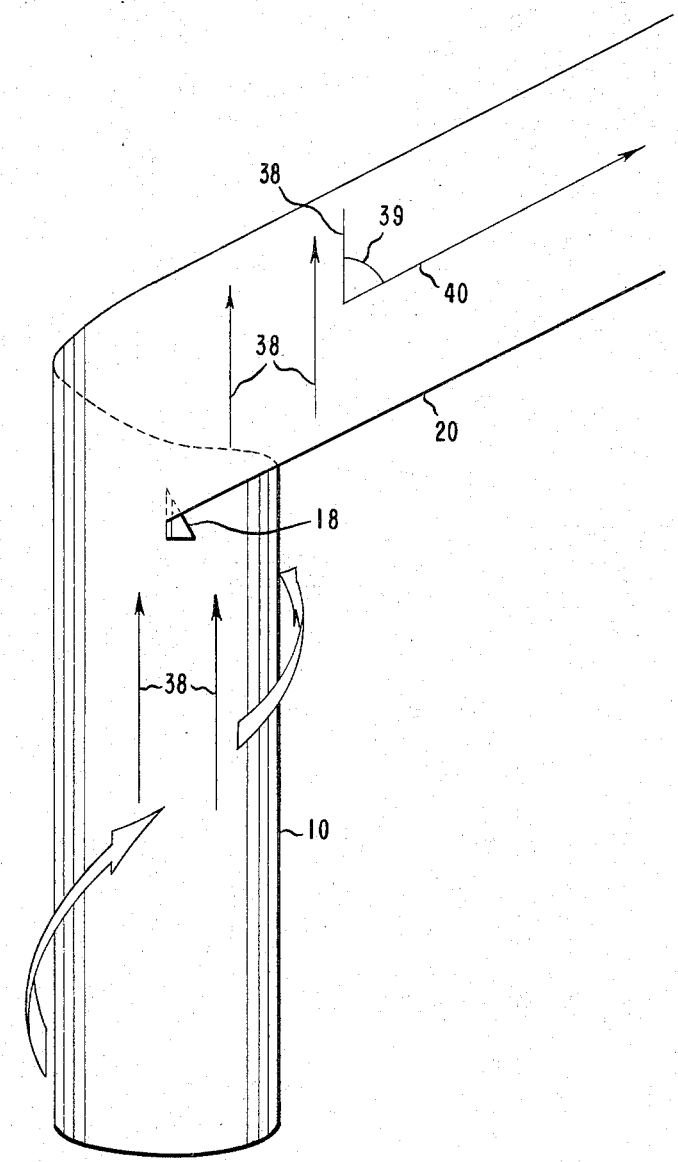

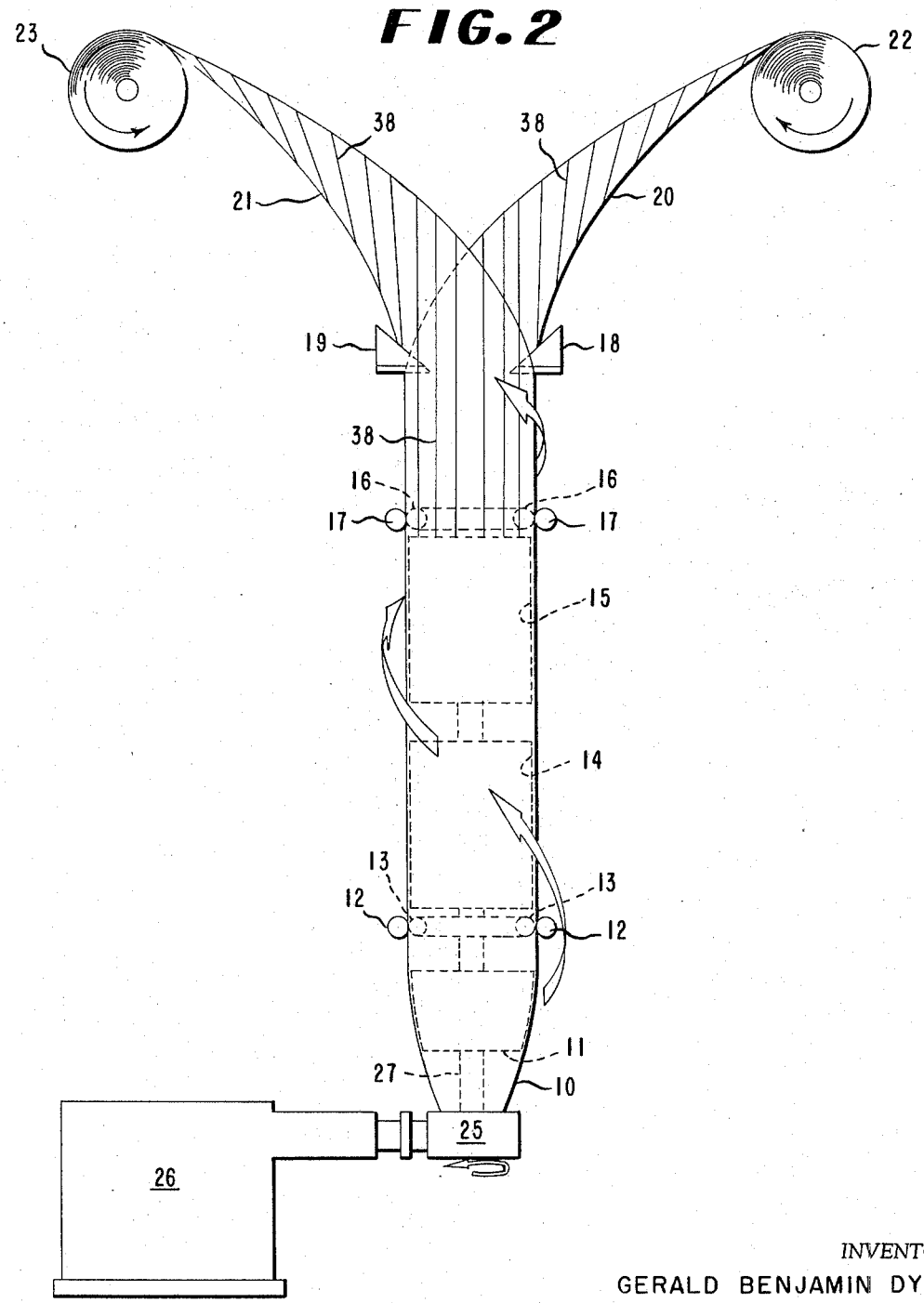

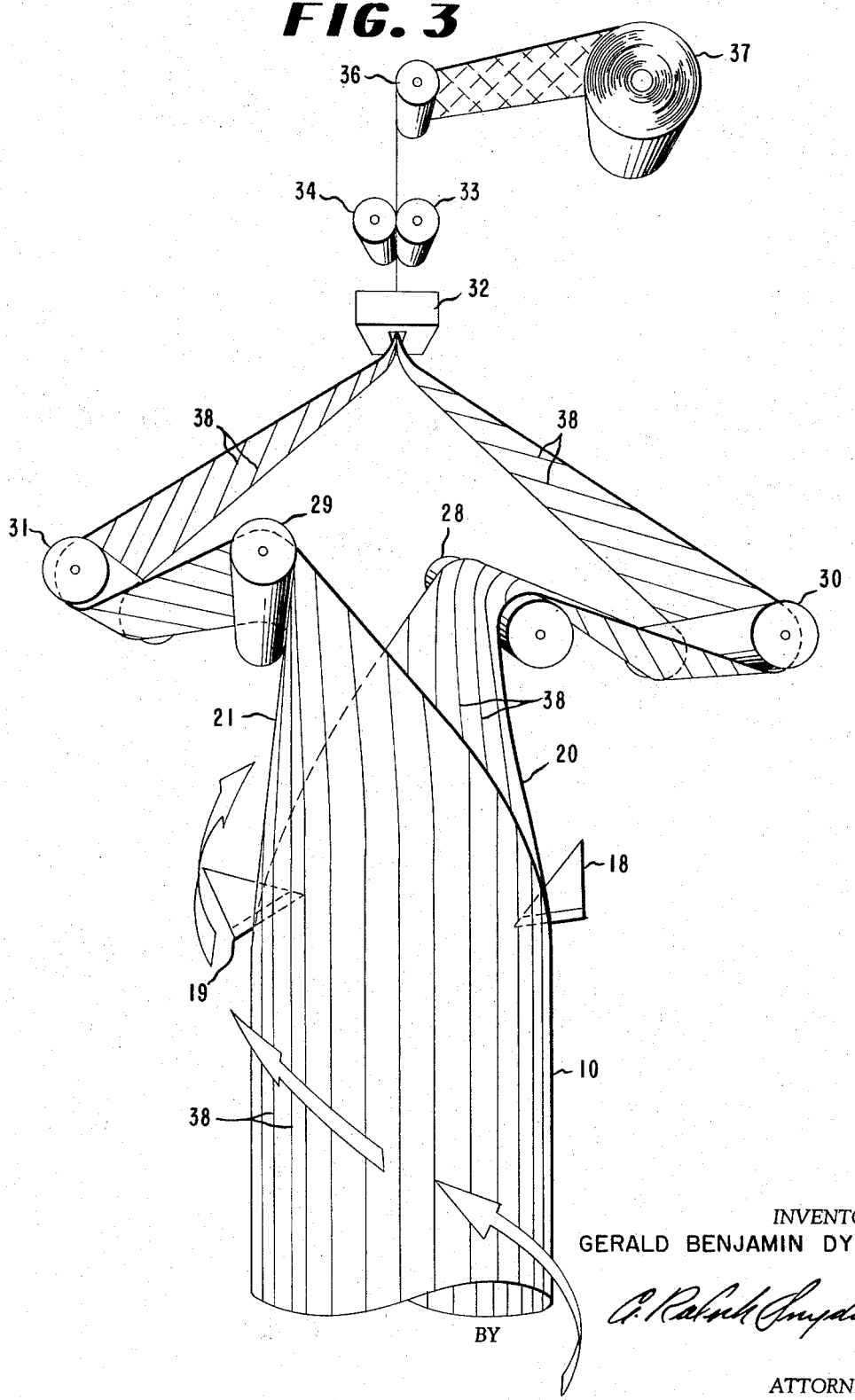

3,342,657
PROCESS AND APPARATUS FOR PRODUCING LAMINATED ORIENTED THERMOPLASTIC FILM
Gerald B. Dyer, Kingston, Ontario, Canada, assignor, by mesne assignments, to E. I. du Pont de Nemours and Company, Wilmington, Del., a corporation of Delaware
Filed Dec. 24, 1963, Ser. No. 333,141
Claims priority, application Great Britain, Dec. 31, 1962, 49,074/62
8 Claims. (Cl. 156—163)

This invention relates to oriented thermoplastic film and in particular to a process for producing film having the direction of orientation disposed angularly to the longitudinal direction of the film.

An object of the present invention is to provide a unique process and apparatus for producing a tube of monaxially oriented film.

A further object of the present invention is to provide a process for cutting a monaxially oriented tube of thermoplastic tubing on the bias to produce a sheet of film having the direction of orientation substantially transverse to the longitudinal direction of the film.

A still further object of the present invention is to provide a process for producing a biaxially oriented film by longitudinally stretching a sheet of monaxially oriented film having the direction of orientation substantially transverse to the longitudinal direction of the film.

Another object of the present invention is to provide a process for producing a continuous strip of laminated oriented film comprising laminating two sheets of monaxially oriented thermoplastic film together such that the directions of orientation of the sheets are at approximately right angles to each other.

Another object of the present invention is to provide a continuous strip of biaxially oriented thermoplastic film in which the angle between the directions of orientation is in the range of from 45° to 89°.

Still another object of the present invention is to provide a continuous strip of thermoplastic film comprising two laminated monaxially oriented sheets one of which has its direction or orientation substantially at right angles to the direction of orientation of the other of said sheets.

Accordingly, there is provided a process for producing a monaxially oriented tube of thermoplastic polymeric material which comprises extruding a tube of thermoplastic material in its formative state, passing said tube over a cooled internal mandrel to cool said tube to a temperature which is below the temperature of said material in its formative state, maintaining sufficient pressure within said tube to at least prevent collapse of the tube, advancing said tube at a predetermined initial rate, heating said tube to the orientation temperature range by passing said tube over a heated internal mandrel, pulling said tube at a rate of from 2 to 5½ times the initial rate to longitudinally monaxially orient said tube, cooling said tube to a temperature which is below the temperature of said material in the formative state by passing said tube about a cooled mandrel.

There is also provided a process for producing a monaxially oriented continuous strip of thermoplastic film in which the direction of orientation is at an angle to the longitudinal direction of said film which comprises extruding a tube of thermoplastic polymeric material in its formative state from a rotating annular die, rotating said tube as it is advanced from said die, passing the rotating tube over a cooled internal mandrel to cool said tube to a temperature which is below the temperature of said material in its formative state, maintaining sufficient pressure within said rotating tube to at least prevent collapse of said tube, advancing said rotating tube at a predetermined initial rate, heating said rotating tube to the orientation temperature range by passing said tube over a heated internal mandrel, pulling said rotating tube at a rate of from 2 to 5½ times the initial rate of longitudinally monaxially orient said tube, cooling said rotating tube so oriented to a temperature which is below the temperature of said material in the formative state by passing said tube about a cooled internal mandrel, and slitting said rotating oriented tube to strip form along substantially helical lines.

There is further provided a process for producing a biaxially oriented film of thermoplastic polymeric material which comprises extruding a tube of thermoplastic polymeric material in its formative state from a rotating annular die, rotating said tube as it is advanced from said die, passing the rotating tube over a cooled internal mandrel to cool said tube to a temperature which is below the temperature of said material in its formative state, maintaining sufficient pressure within said rotating tube to at least prevent collapse of said tube, advancing said rotating tube at a predetermined initial rate, heating said rotating tube to the orientation temperature range by passing said tube over a heated internal mandrel, pulling said rotating tube at a rate of from 2 to 5½ times the initial rate to longitudinally monaxially orient said tube, cooling said rotating tube so oriented to a temperature which is below the temperature of said material in the formative state by passing said tube about a cooled internal mandrel, slitting said rotating oriented tube to strip form along substantially helical lines at an angle of from 45° to 89° to the axis of said tube and subsequently longitudinally stretching said monaxially oriented strip to obtain a biaxially oriented film.

There is still further provided a process for producing a continuous strip of reinforced thermoplastic film which comprises laminating two monaxially oriented continuous sheets of thermoplastic polymeric film in such a way that the direction of orientation of one of said sheets is substantially at right angles to the direction of orientation of the other of said sheets.

There is also provided an apparatus for carrying out each of these processes.

These and other features of the present invention will become evident from the detailed description when taken with the drawings, in which FIGURE 1 is an isometric view of a rotating tube of thermoplastic material and illustrates slitting the tube on the bias, FIGURE 2 is a schematic view of the complete apparatus showing the film being wound on two rolls, and FIGURE 3 is an isometric view of an improved version of the apparatus shown in FIGURE 2 and illustrates the two films being laminated together continuously.

The "orientation temperature range," as defined herein, refers to the temperature range in which molecular orientation of a polymeric film may be effected. This range lies somewhere below the melting temperature of a polymer that melts at a specific temperature or below the crystalline melting point of a crystalline polymer that melts over a range of temperatures. The crystalline melting point refers to the temperature at which the crystallites of a crystalline polymer are no longer detectable under X-ray examination when the solid polymer is heated until it melts.

For some crystalline polymers such as polyethylene, polypropylene and other polyhydrocarbons, the orientation temperature range may be the range of temperature over which the crystallites melt but below the temperature at which the crystallites are no longer detectable. In the case of polyesters such as polyethylene terephthalate and the like, the so-called "crystallizable" polymers, the orientation temperature range extends from about 10° C. to 40° C. above the second order transition temperature of the polymer. The second order transition temperature is that temperature at which an essentially amorphous polymer or one that can be quenched as an amorphous polymer but is crystallizable makes a transition from a glassy state to a rubbery state. It is in this rubbery state that the polymer in the form of a film or a filament can be oriented by stretching.

The specific orientation temperature range will vary from polymer to polymer but may be determined by experimentation or from the literature.

One form which the apparatus may take in the application of the present invention is illustrated in FIGURE 2. A tube 10 of thermoplastic material is extruded from a rotating annular die 25 in its formative state. The die is fed from extruder 26. Air is admitted to the inside of the tube and sufficient pressure is maintained to at least prevent the collapse of the tube. The tube 10 is drawn upwardly over cooler 11 which is supported by support 27 from die 25. This cooler 11 is supplied with a coolant which is usually a liquid. The cooler must have sufficient cooling capacity to reduce the temperature of the film to a temperature which is below the temperature of the thermoplastic material in its formative state. A first set of pull rolls is positioned above the cooler 11. The outer driven rolls 12 engage with the inner idle rolls 13. An internal heater 14 is located above this first set of pull rolls 12 and 13, followed by a second cooler 15. A second set of pull rolls 16 and 17 is mounted above the second cooler. The inner idler pull rolls 16 engage with the outer driven rolls 17 to draw the thermoplastic tubing over heater 14 and the second cooler 15. The second set of pull rolls 16 and 17 is driven at a speed of 2 to 5½ times greater than the speed of the first set 12 and 13, resulting in the film being stretched or oriented in the zone between the two sets of rollers. The heater 14 raises the temperature of the film to the orientation temperature range. Cooler 15 cools and sets the film after it leaves this orientation zone. The cooler 11, first set of pull rolls 12 and 13, heater 14, second cooler 15 and second set of pull rolls 16 and 17 all are mounted coaxially with, and rotate at the same speed as the rotating annular die 25. The tube 10 rotates at this same speed and there is thus no relative rotational motion between any of these components and the thermoplastic tubing.

The product at this stage of the process is a tube of thermoplastic polymeric material which has been oriented longitudinally under conditions which can be very closely controlled. Such an oriented tube is of course a desirable end product. If the process is to be stopped at this point, then there is really no need to rotate the die and associated items such as the coolers, heater and tube pulling rolls.

An interesting concept of the present invention is illustrated in FIGURE 1. A tube of thermoplastic film 10 is rotated in the direction of the arrow. The tube is monaxially oriented in the machine direction or longitudinal direction by means not shown, but which may be similar to that described above. The direction of orientation is indicated by lines 38. A stationary knife 18 slits the tube on the bias as it rotates to form a flat sheet of film 20. The flat sheet 20 is oriented in the direction indicated by the lines 38 and is drawn off in the direction of line 40, this being the new longitudinal direction of the flat sheet or in fact the new machine direction. The angle 39 between the direction of orientation and the new longitudinal direction of the flat sheet may be varied over a quite a large range. In fact it may be varied from approximately 1° to approximately 89°.

Continuing with the description of FIGURE 2, the oriented thermoplastic tube is next slit on the bias as was illustrated in FIGURE 1 by stationary knife 18 or if desired by a pair of knives 18 and 19 to give two flat sheets 20 and 21 which are wound on rolls 22 and 23. The direction of orientation of tube 10 as shown by lines 38 is in the longitudinal direction of the tubing. After slitting the new longitudinal direction of the sheets is at some angle to the direction of orientation.

A most useful product of this invention is obtained when two monaxially oriented sheets produced by the above-described process are laminated together to form a laminated film having the direction of orientation of the two sheets substantially at right angles to each other.

Thus in the apparatus as illustrated in FIGURE 2, if the direction of orientation of each of the sheets 20 and 21 is at approximately 45° to the new longitudinal direction of the sheets and these two sheets are laminated together, the directions of orientation will be at right angles to each other and a relatively high tensile strength film will be thus obtained. In addition, the resultant film overcomes the low tear deficiencies of biaxially oriented films since any tear would always be in the high tear direction of one sheet.

It is obvious of course that a similar laminated film could be made from two sheets, one of which has been oriented substantially at right angles to its longitudinal direction and another sheet which has been oriented in the more usual machine or longitudinal direction.

An improved method for making such a laminated sheet continuously is illustrated in FIGURE 3. The monaxially oriented rotating tube 10 is drawn upwardly and cut on the bias by the two stationary knives 18 and 19 to form two sheets 20 and 21 in which the direction of orientation 38 is at approximately 45° to the longitudinal direction of the sheets. Sheet 20 is taken over rolls 28 and 30 and sheet 21 over rolls 29 and 31. The two sheets are then brought into surface-to-surface contact at laminating means 32. The directions of orientation are approximately at right angles to each other. The biaxially oriented laminated sheet 35 is then taken through nip rolls 33 and 34 over roll 36 and wound on roll 37.

The lamination of the sheets may be effected by extrusion lamination, solvent coating or some other similar means. The adhesive interlayer between the two sheets may be used as a carrier for pigments, color, ultraviolet stabilizers, carbon black or other similar additions to give colored film or film of improved durability and thus overcome the problem of incorporating such additives into the film by expensive compounding techniques.

Another aspect of this invention is the ease with which a biaxially oriented film may be produced. By simply taking the film which is monaxially oriented substantially at right angles to the new longitudinal direction of the sheet and stretching this sheet in its new longitudinal direction, a biaxially oriented film is obtained without the necessity of orienting or stretching the tubing or film in the lateral or transverse directions which is usually an awkward procedure. Various methods of longitudinally stretching and orienting a film are well known in the art and need not be elaborated on here.

The direction of the orientation lines of the monaxially oriented film may be varied over quite a large range. It has been found that acceptable biaxially oriented film may be produced from a monaxially oriented film in which the angle of the initial monaxial orientation is in the range of from 45° to 89° to the longitudinal direction of the film.

I claim:
1. A process for producing a monaxially oriented tube of thermoplastic polymeric material which comprises: extruding a tube of thermoplastic material in its formative state; passing said tube over a cooled internal mandrel to cool said tube to a temperature which is below the temperature of said material in its formative state; maintaining sufficient pressure within said tube to at least prevent collapse of the tube; advancing said tube at a predetermined initial rate; heating said tube to the orientation temperature range by passing said tube over a heated internal mandrel; pulling said tube at a rate of from 2 to 5½ times the initial rate to longitudinally monaxially orient said tube; cooling said tube to a temperature which is below the temperature of said material in the formative state by passing said tube about a cooled internal mandrel.

2. A process for producing a monaxially oriented continuous strip of thermoplastic film in which the direction of orientation is at an angle to the longitudinal direction of said film which comprises: extruding a tube of thermoplastic polymeric material in its formative state from a rotating annular die; rotating said tube as it is advanced from said die; passing the rotating tube over a cooled internal mandrel to cool said tube to a temperature which is below the temperature of said material in its formative state; maintaining sufficient pressure within said rotating tube to at least prevent collapse of said tube; advancing said rotating tube at a predetermined initial rate, heating said rotating tube to the orientation temperature range by passing said tube over a heated internal mandrel; pulling said rotating tube at a rate of from 2 to 5½ times the initial rate to longitudinally monaxially orient said tube; cooling said rotating tube so oriented to a temperature which is below the temperature of said material in the formative state by passing said tube about a cooled internal mandrel; and slitting said rotating oriented tube to strip form along substantially helical lines.

3. A process for producing a biaxially oriented film of thermoplastic polymeric material which comprises extruding a tube of thermoplastic polymeric material in its formative state from a rotating annular die; rotating said tube as it is advanced from said die; passing the rotating tube over a cooled internal mandrel to cool said tube to a temperature which is below the temperature of said material in its formative state; maintaining sufficient pressure within said rotating tube to at least prevent collapse of said tube; advancing said rotating tube at a predetermined initial rate; heating said rotating tube to the orientation temperature range by passing said tube over a heated internal mandrel, pulling said rotating tube at a rate of from 2 to 5½ times the initial rate to longitudinally monaxially orient said tube, cooling said rotating tube so oriented to a temperature which is below the temperature of said material in the formative state by passing said tube about a cooled internal mandrel; slitting said rotating oriented tube to strip form along substantially helical lines at an angle of from 45° to 89° to the axis of said tube and subsequently longitudinally stretching said monaxially oriented strip to obtain a biaxially oriented film.

4. A process for producing a continuous strip of reinforced thermoplastic polymeric film which comprises: extruding a tube of thermoplastic polymeric material in its formative state from a rotating annular die; rotating said tube as it is advanced from said die; passing the rotating tube over a cooled internal mandrel to cool said tube to a temperature which is below the temperature of said material in its formative state; maintaining sufficient pressure within said rotating tube to at least prevent collapse of said tube; advancing said rotating tube at a predetermined initial rate, heating said rotating tube to the orientation temperature range by passing said tube over a heated internal mandrel; pulling said rotating tube at a rate of from 2 to 5½ times the initial rate to longitudinally monaxially orient said tube; cooling said rotating tube so oriented to a temperature which is below the temperature of said material in the formative state by passing said tube about a cooled internal mandrel; slitting said rotating oriented tube into two strips along helical lines substantially at 45° to the axis of said tube; bringing said strips into face-to-face engagement in such a way that the direction of the lines of orientation of one of said strips is substantially at right angles to the direction of the lines of orientation of the other of said strips and laminating said strips together.

5. An apparatus for producing a monaxially oriented tube of thermoplastic polymeric material which comprises: an extruder and an annular die for extruding a seamless tube of thermoplastic polymeric material in a non-self sustaining condition; and mounted coaxially with said die; a first cooling mandrel adjacent to said die; a first and second tube pulling means; a heating mandrel capable of heating said tube to its orientation temperature; and a second cooling mandrel; said second pulling means being capable of advancing said tube at a rate of from 2 to 5½ times the rate of said first pulling means to longitudinally monaxially orient said tube, said heating mandrel and said second cooling mandrel being positioned between said first and second pulling means, and said heating mandrel being positioned between said first and second cooling mandrels.

6. An apparatus for producing a monaxially oriented strip of thermoplastic film in which the direction of orientation is at an angle to the longitudinal direction of the film which comprises: an extruder and a rotating annular die for extruding a rotating seamless tube of thermoplastic polymeric material in a non-self sustaining condition; and mounted coaxially with said die; a first cooling mandrel adjacent to said die; a first and second tube pulling means; a heating mandrel capable of heating said rotating tube to its orientation temperature, and a second cooling mandrel; said second pulling means being capable of advancing said rotating tube at a rate of from 2 to 5½ times the rate of said first pulling means to longitudinally monaxially orient said rotating tube; said heating mandrel and said second cooling mandrel being positioned between said first and second pulling means and said heating mandrel being positioned between said first and second cooling mandrels and means to slit said rotating tube to strip form along substantially helical lines.

7. An apparatus for producing a biaxially oriented film of thermoplastic polymeric material which comprises: an extruder and a rotating annular die for extruding a rotating seamless tube of thermoplastic polymeric material in a non-self sustaining condition; and mounted coaxially with said die; a first cooling mandrel adjacent to said die; a first and second tube pulling means; a heating mandrel capable of heating said rotating tube to its orientation temperature, and a second cooling mandrel; said second pulling means being capable of advancing said rotating tube at a rate of from 2 to 5½ times the rate of said first pulling means to longitudinally monaxially orient said rotating tube; said heating mandrel and said second cooling mandrel being positioned between said first and second pulling means; and said heating mandrel being positioned between said first and second cooling mandrels; means to slit said rotating monaxially oriented tube to strip form along substantially helical lines; and means to longitudinally stretch and longitudinally orient said strip.

8. An apparatus for producing a continuous strip of reinforced thermoplastic polymeric film which comprises: an extruder and a rotating annular die for extruding a rotating seamless tube of thermoplastic polymeric material in a non-self sustaining condition; and mounted coaxially with said die, a first cooling mandrel adjacent to said die, a first and second tube pulling means, a heating mandrel capable of heating said rotating tube to its orientation temperature, and a second cooling mandrel; said second pulling means being capable of advancing said rotating tube at a rate of from 2 to 5½ times the rate of said first pulling means to longitudinally monaxially orient said rotating tube, said heating mandrel and said second cooling mandrel being positioned between said first and second pulling means, and said heating mandrel being positioned between said first and second cooling mandrels; means to slit said rotating tube into two strips along substantially helical lines at approximately 45° to the axis of said tube, and means to laminate said strips in such a way that the direction of the lines of orientation of one of said strips is substantially at right angles to the direction of orientation of the other of said strips.

(References on following page)

References Cited

UNITED STATES PATENTS

| | | | |
|---|---|---|---|
| 2,574,221 | 11/1951 | Modigliani | 156—167 |
| 2,594,229 | 4/1952 | Snyder et al | 156—163 X |
| 3,092,533 | 6/1063 | Beckner | 156—167 |
| 3,132,986 | 5/1964 | Goldman | 156—169 X |
| 3,193,547 | 7/1965 | Schott | 264—146 X |
| 3,265,552 | 8/1966 | Berggren et al. | 156—244 |

EARL M. BERGERT, *Primary Examiner.*

HAROLD ANSHER, *Examiner.*